United States Patent
Cobanoglu et al.

(10) Patent No.: US 11,243,642 B2
(45) Date of Patent: Feb. 8, 2022

(54) CAPACITIVE TOUCH SENSOR

(71) Applicant: Sanko Tekstil Isletmeleri San. Ve Tic. A.S., Inegol-Bursa (TR)

(72) Inventors: Ozgur Cobanoglu, Inegol-Bursa (TR); Ertug Erkus, Inegol-Bursa (TR); Seref Agzikara, Inegol-Bursa (TR); Fehim Caglar, Inegol-Bursa (TR); Deniz Iyidogan, Inegol-Bursa (TR); Semih Kazanc, Inegol-Bursa (TR)

(73) Assignee: Sanko Tekstil Isletmeleri San. Ve Tic. A.S., Inegol-Bursa (TR)

( * ) Notice: Subject to any disclaimer, the term of this patent is extended or adjusted under 35 U.S.C. 154(b) by 0 days.

(21) Appl. No.: 16/580,358

(22) Filed: Sep. 24, 2019

(65) Prior Publication Data

US 2020/0097109 A1 Mar. 26, 2020

(51) Int. Cl.
*G06F 3/044* (2006.01)
*A41D 1/00* (2018.01)
*D03D 1/00* (2006.01)

(52) U.S. Cl.
CPC ............ *G06F 3/044* (2013.01); *A41D 1/005* (2013.01); *D03D 1/0088* (2013.01); *G06F 2203/04102* (2013.01); *G06F 2203/04103* (2013.01)

(58) Field of Classification Search
None
See application file for complete search history.

(56) References Cited

U.S. PATENT DOCUMENTS

2012/0319993 A1   12/2012  Coni et al.
2016/0283101 A1*  9/2016   Schwesig .............. G06F 3/0488

FOREIGN PATENT DOCUMENTS

| EP | 2069894 | 6/2009 |
| EP | 3 355 041 | 8/2018 |
| WO | 20170080984 | 5/2017 |

OTHER PUBLICATIONS

International search report issued by the EPO for PCT/EP2019/075691 dated Nov. 21, 2019.
European Search Report issued by the EPO dated Mar. 14, 2019 for Ep priority application No. 18196531.0.
Office Action issued by the EPO for corresponding EP application No. 19199244.5 dated Oct. 30, 2020 and relavcent reply as filed at the EPO.
International Preliminary Report on Patentability issued by the IB for PCT/EP2019/075691 dated Mar. 23, 2021.

* cited by examiner

*Primary Examiner* — Aneeta Yodichkas
(74) *Attorney, Agent, or Firm* — Silvia Salvadori

(57) ABSTRACT

It is disclosed a capacitive touch sensor (10) comprising a support layer (1) and a plurality of sensing elongated elements (2) coupled to said support layer (1), said plurality of sensing elongated elements (2) comprising a plurality of electrically resistive elongated elements (2r), wherein said plurality of electrically resistive elongated elements (2r) comprises a first set (2rx) of electrically resistive elongated elements (2r) electrically connected to a first common node (Nx) configured to be electrically connected to a first input (INx) of a detection device (5), said detection device (5) being configured to provide an output signal (S_OUT) comprising a first output value (OUTx) that is a function of the capacitance value (CRx) of said first set (2rx) of electrically resistive elongated elements (2r). An article comprising the capacitive touch sensor (10) and a method for detecting a touch event on a support layer (1) are also disclosed.

18 Claims, 5 Drawing Sheets

CAPACITIVE TOUCH SENSOR

This Application is a U.S. Non-provisional application which claims priority to and the benefit of European Patent Application No. EP18196531.0 filed on 25 Sep. 2018, the content of which is incorporated herein by reference in its entirety.

TECHNICAL FIELD

The present invention relates to the field of the capacitive sensing. In particular, the present invention relates to a capacitive touch sensor suitable for detecting touch events on a support layer, for example a fabric.

BACKGROUND

Capacitive touch sensors embedded in a fabric are known. For example, US2016048235A1 discloses a fabric implementing a capacitive touch sensing comprising a plurality of electrically conductive wires, electrically insulated from each other, and arranged to form a grid.

Each wire is connected to a controller configured to evaluate the capacitance value of each wire. The controller detects the position of a touch event by detecting which horizontal wire and which vertical wire is touched, by detecting changes in capacitance of each respective wire of the capacitive grid. The controller uses the intersection of the crossing wires that are touched to determine the position of the touch event on the capacitive grid, so that the position of the touch is determined as X, Y coordinates on the capacitive grid.

The capacitive grid can be embedded in a fabric by using the electrically conductive wires as weft yarns and warp yarns. However, each electrically conductive wire of the capacitive grid (vertical and horizontal wires) have to be electrically connected to a correspondent input port of a sensing circuit.

When the capacitive grid has a great number of electrically conductive wires (for example if a wide sensing area of the touch sensor is desired), the number of input ports of the sensing circuit may be great and the routing of the electrical connections between the capacitive grid and the sensing circuit may be very complex.

Also in the case of a touch sensor having electrically conductive wires arranged parallel along only one direction (e.g. in case of a swipe sensor), the number of electrically conductive wires may be great, making the routing of the electrical connections complex and expensive during the design and production steps of the touch sensor.

SUMMARY OF THE INVENTION

An object of the present invention is to overcome the drawbacks of the prior art cited above and to provide a capacitive touch sensor having a wide sensing area and a simple routing of electrical connections.

A further object of the present invention is to provide a capacitive touch sensor and a relating method for detecting a touch event that allow to reduce the number of input ports necessary for the detection of the touch event irrespective of the sensing area size of the capacitive touch sensor.

These and other objects are achieved by the present invention by a capacitive touch sensor, an article comprising such a capacitive touch sensor, and a method for detecting a touch event according to the independent claims. Preferred aspects of the invention are recited in dependent claims.

In particular, according to the present invention, the capacitive touch sensor comprises a support layer and a plurality of sensing elongated elements coupled to the support layer.

The term "elongated element" means an element having a shape similar to a thread (i.e. a thread-like element). An example of elongated element is a yarn. In general, in an elongated element, two of the three dimensions are much lower than and generally negligible with respect to the third dimension. For example, an elongated element may have the shape of a strip having width and thickness negligible with respect to the length. Preferably, elongated elements have two of the three dimensions comparable between them and negligible with respect to the third dimension (ideally a line). For example, elongated elements may be wires, yarns, filaments or traces of material arranged along a linear path. In an elongated element one of the three dimensions, i.e. the length, is at least ten times greater than the other two dimensions, preferably at least twenty times, more preferably at least fifty times.

The sensing elongated elements comprise a first set of electrically resistive elongated elements electrically connected to a first common node configured to be electrically connected to a first input of a detection device.

The detection device is configured to provide an output signal comprising a first output value that is a function of the capacitance value of the first set of electrically resistive elongated elements.

For example, the support layer may be a flexible layer (for example a film or a non-woven fabric) having the sensing elongated elements coupled on its surface, or integrated therein. Other embodiments may provide that the support layer is a composite layer having the sensing elongated elements sandwiched between two layers of the composite layer. A preferred embodiment may provide that the support layer is a fabric (e.g. a non-woven fabric, or a fabric produced by weaving, knitting, crocheting, knotting, tatting, felting, or braiding).

According to an aspect of the present invention, the electrical resistance per unit of length of an electrically resistive elongated element is comprised between 10 k$\Omega$/m and 10 M$\Omega$/m, preferably comprised between 50 k$\Omega$/m and 500 k$\Omega$/m.

Each electrically resistive elongated element has a capacitance value that changes when an object touches it (a parasitic capacitance of the object is coupled to the touched electrically resistive elongated element). The change in capacitance value of the electrically resistive elongated element is function of two main aspects: the parasitic capacitive coupling between the electrically resistive elongated element and the object touching it, and the location on which the touching event occurred along the length of the electrically resistive elongated element with respect to the read-out point (i.e. with respect to the point on which the electrically resistive elongated element is electrically connected to the detection device).

Basically, each electrically resistive elongated element can be represented with a lumped model of a capacitor in series with a resistor having a resistance value depending on the position of the touch event (i.e. the position on which the parasitic capacitance of the object is applied to the electrically resistive elongated element).

Thanks to this aspect, a single common node can be used for evaluating the capacitance of a plurality of electrically resistive elongated elements arranged to define a sensing area within which a touch event can be detected. In other words, the electrically resistive elongated elements are arranged so that when a touch event occurred on the sensing area (e.g. an object or the finger of a user touches the sensing area), at least an electrically resistive elongated element is touched.

In particular, by connecting a plurality of electrically resistive elongated elements to a common node, an equivalent capacitance, substantially equal or proportional to the sum of the capacitance values of the electrically resistive elongated elements, may be evaluated. The capacitance value evaluated at the common node of the electrically resistive elongated elements provides an indication of the position of a touch event with respect to the position of the common node.

Some embodiments may provide that the detection device is configured to provide an output signal comprising a first output value that is the direct or indirect measurement of the capacitance of the first set of electrically resistive elongated elements. Thanks to this embodiment, the capacitive touch sensor can be for example employed as a swipe sensor for detecting the swipe direction of a touch event along the electrically resistive elongated elements with respect to the common node by means of a single input port of the detection device irrespectively of the sensing area size.

Some embodiments may provide that the plurality of sensing elongated elements comprises one or more electrically conductive elongated elements, electrically insulated from the electrically resistive elongated elements, and arranged at least partially within the sensing area defined by the electrically resistive elongated elements. The electrically conductive elongated elements are electrically connected to a reference common node configured to be electrically connected to a reference input of the detection device.

According to an aspect of the present invention, number and arrangement of the electrically conductive elongated elements is chosen so that when a touch event occurs on the sensing area defined by the electrically resistive elongated elements, at least one electrically conductive elongated element is touched.

Preferably, the electrically conductive elongated elements are arranged to define an area overlapping the sensing area defined by the electrically resistive elongated elements. More preferably, each electrically conductive elongated element is coupled to a correspondent electrically resistive elongated element of the plurality of sensing elongated elements and vice versa.

According to an aspect of the present invention, the electrical resistance per unit of length of each electrically conductive elongated element is less than 200 $\Omega/m$, preferably less than 50 $\Omega/m$, more preferably less than or equal to about 10 $\Omega/m$. Preferably, the ratio between the values of electrical resistance per unit of length of the electrically resistive elongated elements and the electrically conductive elongated elements is in range of 100 to 1000000, more preferably 1000 to 100000.

For example, the electrical resistance per unit of length may be measured by following the standard AATCC Test Method 84-2011 or AATCC Test Method 84-2018.

Some embodiments may provide that the output signal provided by the detection device comprises a reference output value that is the direct or indirect measurement of the capacitance of the electrically conductive elongated elements.

According to an aspect of the present invention, each electrically conductive elongated element has a capacitance value that changes in response to a touch event; said change in value is substantially independent from the location on which the touching event occurred along its length.

According to an aspect of the present invention, when an object touches an electrically conductive elongated element, the change in capacitance value depends substantially only from the capacitive coupling between the electrically conductive elongated element and the object touching it.

Thanks to this aspect, the capacitance value of the electrically conductive elongated elements may be used, together with the capacitance value of the electrically resistive elongated elements, to obtain an indication of the position of a touch event on the sensing area substantially independent from the capacitive coupling between the electrically resistive elongated elements and the object touching them.

For example, the reference output value can be used to calculate the ratio between the direct or indirect measurement of the capacitance of the first set of electrically resistive elongated elements and the direct or indirect measurement of the capacitance of the electrically conductive elongated elements.

Some embodiments may provide that the first output value of the output signal provided by the detection device is the ratio between the direct or indirect measurement of the capacitance of the first set of electrically resistive elongated elements and the direct or indirect measurement of the capacitance of the electrically conductive elongated elements.

As a result, by means of only two input ports of the detection device, the capacitive touch sensor can be employed for detecting the location of a touch event along the electrically resistive elongated elements with respect to the common node independently from the capacitive coupling between the resistive elongated elements and the object touching them.

According to an aspect of the present invention, the plurality of electrically resistive elongated elements comprises a second set of electrically resistive elongated elements, electrically insulated from the first set of electrically resistive elongated elements, and electrically connected to a second common node configured to be electrically connected to a second input of the detection device.

In particular, the first set and the second set of electrically resistive elongated elements overlap to form a grid of electrically resistive elongated elements. According to this embodiment, the output signal comprises a second output value that is a function of the capacitance value of the second set of electrically resistive elongated elements.

Some embodiments may provide that the second output value is the direct or indirect measurement of the capacitance of the second set of electrically resistive elongated elements.

Some embodiments may provide that sensing elongated elements comprise one or more electrically conductive elongated elements and that the second output value is the ratio between the direct or indirect measurement of the capacitance of the second set of electrically resistive elongated elements and the direct or indirect measurement of the capacitance of the electrically conductive elongated elements.

According to an aspect of the present invention, the electrically resistive elongated elements of the first set are arranged parallel to each other along a first direction. Preferably, the electrically resistive elongated elements of the second set are arranged parallel to each other along a second direction substantially orthogonal to the first direction.

Some embodiments of the present invention may provide that the detection device is connected to a communication module configured to transmit the output signal to an external device (e.g. a smartphone, a smart TV, or other similar devices).

According to an aspect of the present invention, the elongated sensing elements are sensing yarns.

Some embodiments may provide that the electrically resistive elongated elements are electrically resistive yarns.

Some embodiments may provide that the electrically conductive elongated elements are electrically conductive yarns.

Preferably, the support layer is a fabric, more preferably a woven fabric.

According to an aspect of the present invention, the support layer is a woven fabric, and the sensing elongated elements form at least a part of the weft and/or of the warp of the woven fabric.

A further object of the present invention is an article comprising the capacitive touch sensor according to the present invention. The article may be for example a garment.

Preferably, the article comprises the detection device for evaluating the capacitance values of the sensing yarns.

A further object of the present invention is a method for detecting a touch event on a support layer comprising the following steps:
(a) providing an output signal providing a capacitive touch sensor according to anyone of the embodiments of the present invention;
(b) evaluating the capacitance of the sensing elongated elements;
(c) providing an output signal comprising one or more output values that are a function of the capacitance evaluated in the step (b).

According to an aspect of the present invention, the support layer is a fabric and the sensing elongated elements are sensing yarns.

Some embodiments may provide that the method according to the present invention comprises a step of transmitting the output signal to an external device.

BRIEF DESCRIPTION OF THE DRAWINGS

The invention will now be described in greater detail, by way of example, with reference to the accompanying non limiting drawings. It is emphasized that, according to common practice, the various features of the drawing are not necessarily to scale. On the contrary, the dimensions of the various features are arbitrarily expanded or reduced for clarity. Like numerals denote like features throughout the specification and the drawings in which.

DETAILED DESCRIPTION

FIGS. 1-5 show exemplary embodiments of a capacitive touch sensor 10 according to the present invention. The capacitive touch sensor 10 comprises a support layer 1 and a plurality of sensing elongated elements 2 coupled to the support layer 1.

For the sake of simplicity, the following description of a touch sensor 10 according to the exemplary embodiments of the present invention shown in FIGS. 1-5 refers to sensing yarns 2, however the teaching of the description can be applied to a touch sensor having generic elongated elements in the place of yarns.

Figure 1:
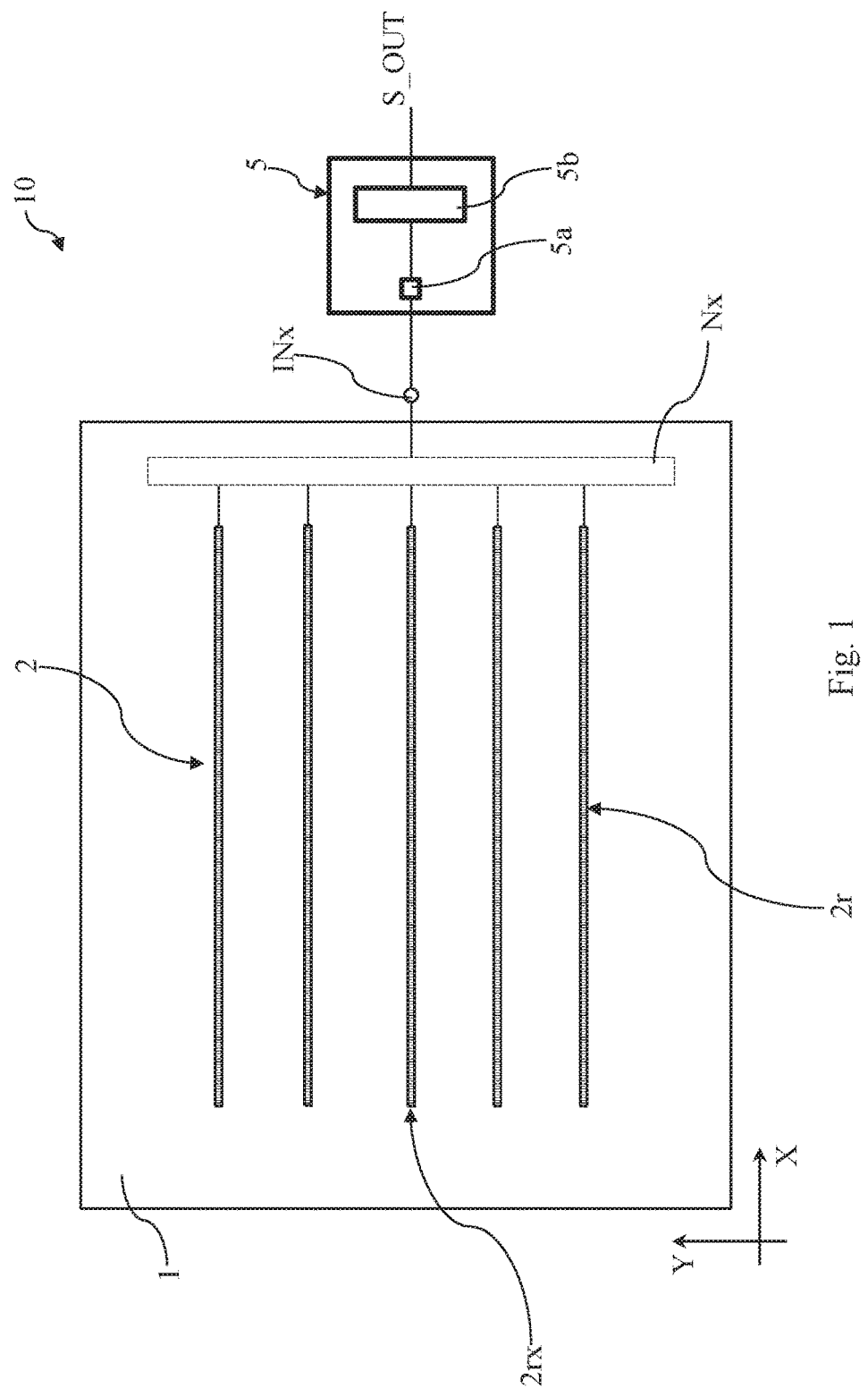
FIGS. 1-5 are perspective view that schematically show possible embodiments of a capacitive touch sensor according to the present invention.

With respect to FIG. 1, sensing yarns 2 comprise a first set $2rx$ of electrically resistive yarns $2r$ electrically connected to a first common node Nx (symbolically indicated as a dotted rectangle) configured to be electrically connected to a first input INx of a detection device 5.

A common node may be constituted by connections having ideally zero resistance (for example a common node may be provide by an electrically conductive yarn). The detection device 5 is configured to provide an output signal S_OUT comprising a first output value OUTx that is a function of the capacitance value CRx of the first set $2rx$ of electrically resistive yarns $2r$.

Preferably, the electrically resistive yarns $2r$ have an electrical resistance per unit of length Rr comprised between 10 k$\Omega$/m and 10 M$\Omega$/m, more preferably comprised between 50 k$\Omega$/m and 500 k$\Omega$/m, for example about 200 k$\Omega$/m. In other words, the cross section and the electrical resistivity of the electrically resistive yarns $2r$ are chosen to obtain a meter of electrically resistive yarn $2r$ having an electrical resistance comprised between 10 k$\Omega$ and 10 M$\Omega$, more preferably comprised between 50$\Omega$ and 500 k$\Omega$, for example about 200 k$\Omega$.

For example, the electrically resistive yarns $2r$ have electrical resistivity comprised between $10^{-6}$ $\Omega$m and $10^{3}$ $\Omega$m, more preferably between $10^{-4}$ $\Omega$m and $10^{-1}$ $\Omega$m.

The electrically resistive yarns $2r$ are preferably plastic yarns (e.g. nylon) filled with electrically conductive elements (e.g. electrically conductive carbon). More preferably, the electrically resistive yarns $2r$ may comprise 80-denier nylon 6,6 having electrically conductive carbon suffused into its surface.

For example, a suitable electrically resistive yarn $2r$ may be the electrically resistive yarn available with the commercial name RESISTAT© F901, MERGE R080 that is a 80-denier nylon 6,6 monofilament which has electrically conductive carbon suffused into the surface. This particular resistive yarn has a round cross section with a coating thickness of about 1 µm, and a linear mass density of about 84 denier. The electrical resistance of this resistive yarn is about $0.8 \times 10^5$ $\Omega$ per centimeter (i.e. about 80 k$\Omega$/m). Even if the embodiment shown in FIG. 1 shows a first set $2rx$ of electrically resistive yarns $2r$ arranged parallel to each other, other embodiments may provide different arrangements of the electrically resistive yarns still remaining within the scope of protection of the present invention. For example, some embodiments may provide that the electrically resistive yarns $2r$ of the first set $2rx$ are arranged radially with respect to a central point. These embodiments may provide that the end facing to the central point of each electrically resistive yarn is electrically connected to the first common node Nx, or that the opposite end to the central point of each electrically resistive yarn is electrically connected to the first common node Nx.

With respect to FIG. 1, the electrically resistive yarns $2r$ of the first set $2rx$ are preferably arranged parallel to each other along a first direction X. This embodiment provides that the capacitive touch sensor 10 implements a one-dimensional swipe sensor (i.e. a capacitive touch sensor able to detect the swipe direction of a touch event along at the first direction X).

According to this embodiment, the first output value OUTx of the output signal is the direct or indirect measurement of the capacitance CRx of the first set $2rx$ of electrically resistive yarns $2r$.

The capacitance value CRx may be evaluated for example by measuring the charging time, or the oscillation frequency of an oscillator, or by other measuring technics known in the art.

Some embodiments may provide that the detection device 5 comprises a front-end circuit 5a and that the first input INx is the input of the front-end circuit 5a. For example, the front-end circuit 5a may comprise at least one oscillator (e.g. a Colpitts oscillator). The first common node Nx of the electrically resistive yarns 2rx is connected to the oscillator that has (in absence of a touch event) a predetermined oscillation frequency.

A change of the capacitance value CRx of the first set 2rx of electrically resistive yarns 2r is detected as a change of the oscillation frequency of the oscillator. In other words, by evaluating the oscillation frequency of the oscillator, the capacitance value CRx of the electrically resistive yarns 2rx can be evaluated.

Preferably, the detection device 5 comprises a microcontroller 5b connected to the front-end circuit 5a, and configured to calculate the capacitance values CRx of the first set 2rx of electrically resistive yarns 2r on the basis of the oscillation frequency of the oscillator.

Some embodiments may provide that the detection device 5 comprises a front-end circuit 5a and a microcontroller 5b that sends a forward signal (e.g. a Boolean signal) to a forward terminal of the front-end circuit 5a. The front-end circuit 5a comprises a returning terminal that provide a return signal with a delay with respect to the forward signal. The delay between the forward signal and the return signal is a function of the charging time of the electrically resistive yarns 2rx that is in turn a function of the capacitance value CRx of the electrically resistive yarns.

As explained above, a change in the capacitance value CRx of the electrically resistive yarns 2rx is indicative of a touch event occurred on one or more electrically resistive yarns 2rx. Assuming that the touch area size of a touch event is substantially constant (i.e. the number of touched electrically resistive yarns 2rx remain constant during a touch event), the first output value OUTx is indicative of the swipe direction of a touch event along the first direction X.

In particular, the detection device 5 is preferably configured to provide an output signal S_OUT comprising a first output value OUTx that is the measurement of the capacitance value CRx of the electrically resistive yarns 2rx preferably updated with a predetermined cadency having a refresh period (e.g. some milliseconds) during which the capacitance value CRx is reevaluated for updating the output value OUTx.

When the first output value OUTx overcome a determined threshold value means that a touch event occurred. In particular, as long as the first output value is greater than the threshold value, an increase over time of the first output value OUTx means that a touch event occurred with a swipe direction towards the common node Nx. Analogously, the decrease of the first output value OUTx means that the swipe direction of a touch event occurred toward the opposite direction, i.e. away from the common node Nx.

Thanks to the capacitive touch sensor 10 according to the present invention, only a single input INx is necessary for implementing a unidimensional swipe sensor. The sensing area 3 defined by the electrically resistive yarns 2rx can be increased (increasing the number and/or the length of the electrically resistive yarns) without the need of increasing the number of input ports of the detection device 5.

Figure 2:
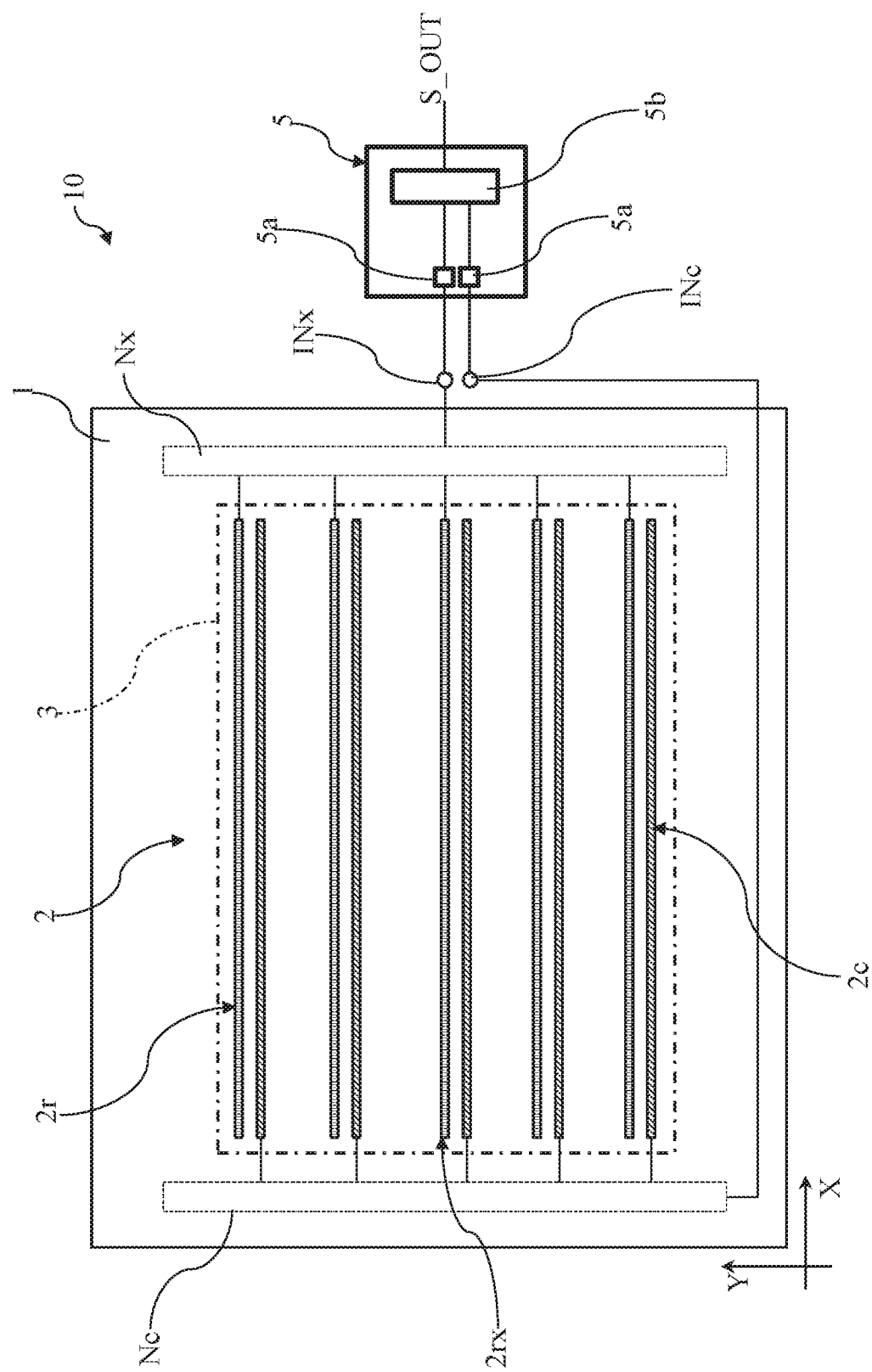

FIG. 2 shows a further embodiment of a capacitive touch sensor 10 according to the present invention. The capacitive touch sensor 10 shown in FIG. 2 comprises the same first set 2rx of electrically resistive yarns 2r of the embodiment shown in FIG. 1. The sensing area 3 defined by the electrically resistive yarns 2r is symbolically indicated as a dotted rectangle.

With respect to FIG. 2, sensing yarns 2 further comprise a plurality of electrically conductive yarns 2c arranged at least partially within the sensing area 3 and electrically insulated from the electrically resistive yarns 2r.

The electrically conductive yarns 2c are electrically connected to a reference common node Nc configured to be electrically connected to a reference input INc of the detection device 5 for evaluating the capacitance value Cc of the electrically conductive yarns 2c.

The detection device 5 is preferably configured to evaluate the capacitance value Cc of the electrically conductive yarns 2c by means of the same techniques above discussed for the evaluation of the capacitance value CRx of the first set 2rx of electrically resistive yarns 2r.

Even if the embodiment of FIG. 2 shows a capacitive touch sensor 10 having a plurality of electrically conductive yarns 2c, further embodiment may provide that sensing yarns 2 comprise only one electrically conductive yarn 2c arranged at least partially within the sensing area 3 and electrically connected to the reference common node Nc. Preferably, the electrically conductive yarn 2c is arranged to define an area overlapping the sensing area 3 defined by the electrically resistive yarns 2r. For example a single electrically conductive yarn 2c may be arranged along a snake-shaped path so that the area defined by the electrically conductive yarn overlaps the sensing area 3.

In general, sensing yarns 2 may preferably comprise at least one electrically conductive yarn 2c. In particular, some embodiments may provide that the number of electrically conductive yarns 2c is different from the number of the electrically resistive yarns 2r. According to an aspect of the present invention, number and arrangement of the electrically conductive yarns 2c is chosen so that when a touch event occurs on the sensing area 3 defined by the electrically resistive yarns 2r, at least one electrically conductive yarn 2c is touched.

With respect to FIG. 2, each electrically conductive yarn 2c is associated to a correspondent electrically resistive yarn 2r and vice versa. In other words, the embodiment shown in FIG. 2 provides that the number of electrically conductive yarns 2c is equal to the number of electrically resistive yarns 2r and that for each electrically resistive yarn 2r an electrically conductive yarn 2c is associated thereto.

The electrically conductive yarns 2c are electrically insulated from the electrically resistive yarns 2r, for example by an electrically insulating coating provided on the surface of the electrically conductive yarns 2c.

The electrically conductive yarns 2c are preferably insulated metal wires, for example magnet wires. A magnet wire, also called "enameled wire" is a metal wire (for example made of copper or aluminum) coated with a very thin layer of insulation. Magnet wires are commercially available and are typically used in the construction of transformers, inductors, motors, speakers, hard disk head actuators, electromagnets, and other applications that require tight coils of insulated wire.

Preferably, the electrically conductive yarns 2c has an electrical resistance per unit of length Rc less than 200 $\Omega$/m, more preferably less than 50 $\Omega$/m, for example about 10 $\Omega$/m. In other words, the cross section and the electrical resistivity of the electrically conductive yarns 2c are chosen to obtain a meter of electrically conductive yarn 2c having an electrical resistance less than 200Ω, more preferably less than 50Ω, for example about 10Ω.

For example, the electrically conductive yarns 2c may be made of a material having electrical resistivity less than $10^{-6}$ Ωm, more preferably less than $10^{-7}$ Ωm (e.g. silver, copper, gold, aluminum, platinum, iron may be suitable materials for the electrically conductive yarns 2c).

According to an aspect of the present invention, the electrical resistance per unit of length of the electrically conductive yarns 2c is at least two order of magnitude less than the electrical resistance per unit of length of the electrically resistive yarns 2r.

Preferably, the ratio Rr/Rc between the values of electrical resistance per unit of length of the electrically resistive yarns 2r and the electrically conductive yarns 2c is in range of 100 to 1000000, more preferably 1000 to 100000.

With respect to FIG. 2, some embodiments may provide that the output signal S_OUT comprises a reference output value OUTc that is the direct or indirect measurement of the capacitance value Cc of the electrically conductive yarns 2c. In other words, these embodiments may provide that the output signal S_OUT comprises a couple of output values (the first output value OUTx and the reference output value OUTc) that are the measurement of the capacitance value CRx and Cc of the electrically resistive yarns 2rx and of the electrically conductive yarns 2c, preferably updated with a predetermined cadency having a refresh period (e.g. some milliseconds) during which the capacitance values CRx and Cc are reevaluated for updating the output values OUTx and OUTc.

The reference output value OUTc can be used to calculate the ratio CRx/Cc between the direct or indirect measurement of the capacitance value CRx of the first set 2rx of electrically resistive yarns 2r and the direct or indirect measurement of the capacitance value Cc of the electrically conductive yarns 2c.

Some embodiments may provide that the detection device 5 is configured to calculate (for example by means of the microcontroller 5b) the ratio CRx/Cc between the direct or indirect measurement of the capacitance CRx of the first set 2rx of electrically resistive yarns 2r and the direct or indirect measurement of the capacitance Cc of the electrically conductive yarn 2c. In these embodiments, the first output value OUTx may be preferably the ratio CRx/Cc. More preferably, the detection device 5 may be configured to provide an output signal S_OUT comprising only the first output value OUTx.

In these embodiments, the detection device 5 is preferably configured to provide an output signal S_OUT comprising a first output value OUTx that is the ratio CRx/Cc between the measurements of the capacitance value CRx of the electrically resistive yarns 2rx and the capacitance value Cc of the electrically conductive yarns 2c, preferably updated with a predetermined cadency having a refresh period (e.g. some milliseconds) during which the capacitance values CRx and Cc is reevaluated to recalculate the ratio CRx/Cc for updating the output value OUTx.

As a result, the capacitive touch sensor 10 may be employed for detecting the location (in addition to the swipe direction) of a touch event along the first direction X with respect to the first common node Nx.

As explained above, the change in the capacitance value CRx of the first set 2rx of electrically resistive yarns 2r is function of two main aspects: the parasitic capacitive coupling between the electrically resistive yarn 2rx and the object touching it, and the location on which the touching event occurred along the length of the electrically resistive yarns with respect to the common node Nx. Moreover, the change in the capacitance value Cc depends substantially only from the capacitive coupling between the electrically conductive yarns and the object touching them, i.e. the change in value of Cc is substantially independent from the location on which the touching event occurred along the length of the electrically conductive yarns 2c.

As a result, when an object touches the sensing area 3, a change in value of capacitance CRx and Cc occurs. The value of the ratio CRx/Cc is indicative of the location of a touch event along the first direction X with a negligible dependency of the capacitive coupling between the electrically resistive yarns 2rx and the object touching them. In other words, the value of the ratio CRx/Cc is indicative of the location of a touch event along the first direction X with respect to the position of the common node Nx irrespectively of how strong is the capacitive coupling between the electrically resistive yarns and the object touching them.

Thus, when a touch event occurs on the sensing area 3 the ratio CRx/Cc overcomes a determined threshold value and assumes a value within a determined range comprised between a lower and a upper values. Such lower value and upper value can be considered as two points in a one-dimensional space arranged parallel to the first direction X. For example, the lower value can be considered as the origin of the one-dimensional space.

If the ratio CRx/Cc assumes the upper value means that the touch event occurred at the end of the electrically resistive yarns 2rx electrically connected to the common node Nx. Analogously, the lower value of the ratio CRx/Cc indicates that the touch event occurred at the opposite end of the electrically resistive yarns 2rx.

The value of the ratio CRx/Cc can be used to obtain the swipe direction of a touch event occurred on the sensing area 3 along the first X direction, without giving information about what electrically resistive yarn 2rx was touched. In other words, the value of the ratio CRx/Cc does not change if a touch event swipes along a second direction Y orthogonal to the first direction X.

Figure 3:
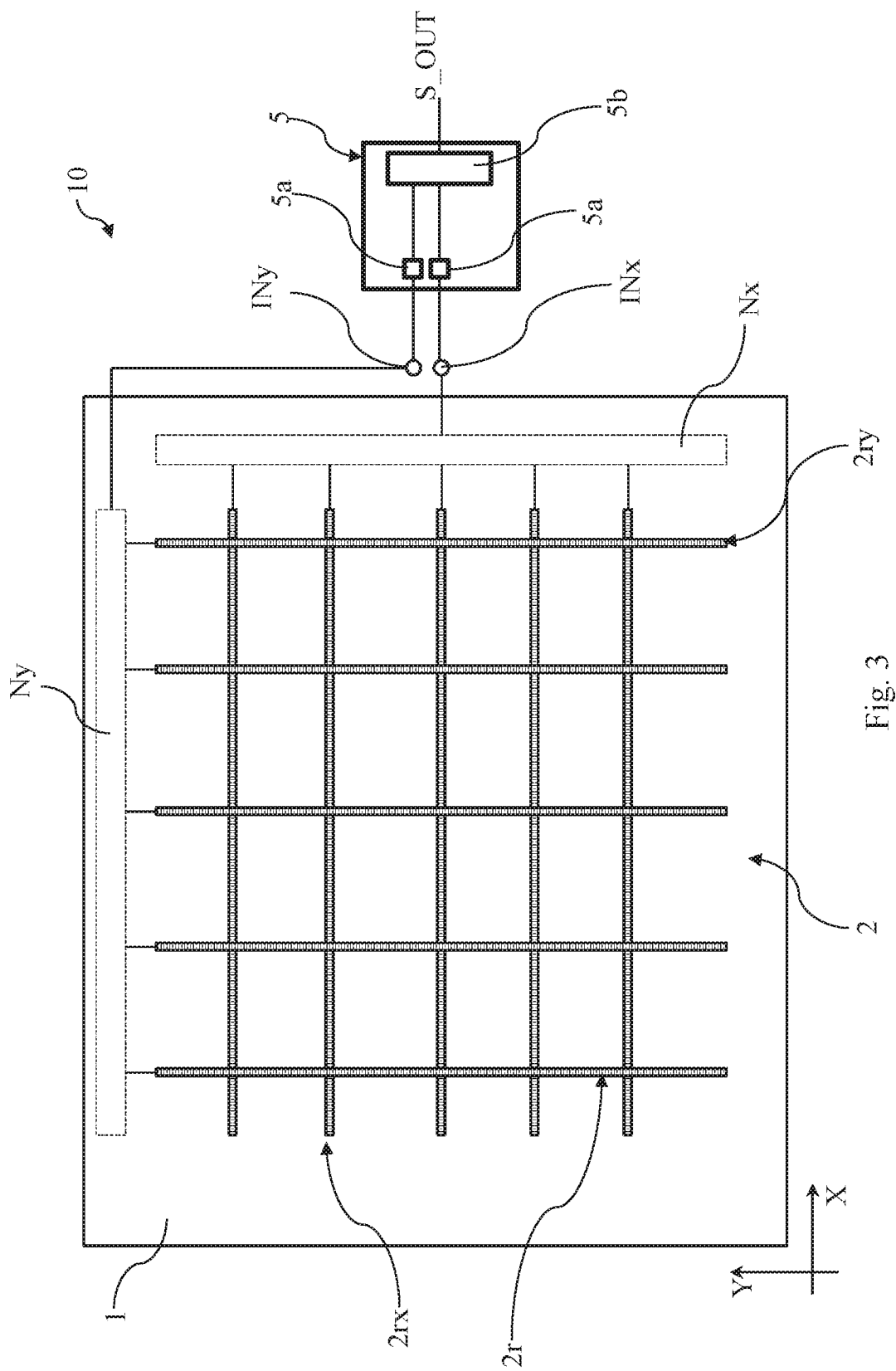

Some embodiments may provide that a plurality of sub-ranges comprised between the lower and the upper values of the ratio CRx/Cc can be defined, so that different regions of the sensing area 3 can be used for detecting the swipe direction of a touch event. FIG. 3 shows a further embodiment of a capacitive touch sensor 10 according to the present invention. The capacitive touch sensor 10 shown in FIG. 3 comprises the same first set 2rx of electrically resistive yarns 2r of the embodiment shown in FIG. 1, and a second set 2ry of electrically resistive yarns 2r, electrically insulated from the first set 2rx of electrically resistive yarns 2r.

The electrically resistive yarns of the second set 2ry are electrically connected to a second common node Ny configured to be electrically connected to a second input INy of the detection device 5.

The first set 2rx and said second set 2ry of electrically resistive yarns 2r overlap to form a grid of electrically resistive yarns 2r. Preferably, the electrically resistive yarns of said second set 2ry are arranged parallel to each other along a second direction Y substantially orthogonal to the first direction X.

The detection device 5 is configured to provide an output signal S_OUT comprising a first output value OUTx and a second output value OUTy that are a function of the capacitance value CRx and CRy of the first set 2rx and of the second set 2ry of electrically resistive yarns 2r respectively.

The detection device 5 is preferably configured to evaluate the capacitance values CRx and CRy of the first and second set 2*rx*, 2*ry* of electrically resistive yarns by means of the same techniques discussed above.

In particular, the output values OUTx and OUTy are the direct or indirect measurements of the capacitance CRx and CRy of the first set 2*rx* and of the second set 2*ry* of electrically resistive yarns 2*r*.

This embodiment provides that the capacitive touch sensor 10 implements a two-dimensional swipe sensor (i.e. a capacitive touch sensor able to detect the swipe direction of a touch event on a orthogonal plane X-Y).

In other words, the output values OUTx and OUTy can be considered as the components of a vector on a Cartesian plane that indicates the swipe direction of a touch event. Thanks to this embodiment the capacitive touch sensor 10 needs of only two inputs INx, INy for the detection of the swipe direction of a touch event also in case of a wide sensing area and/or a great number of sensing yarns.

Figure 4:
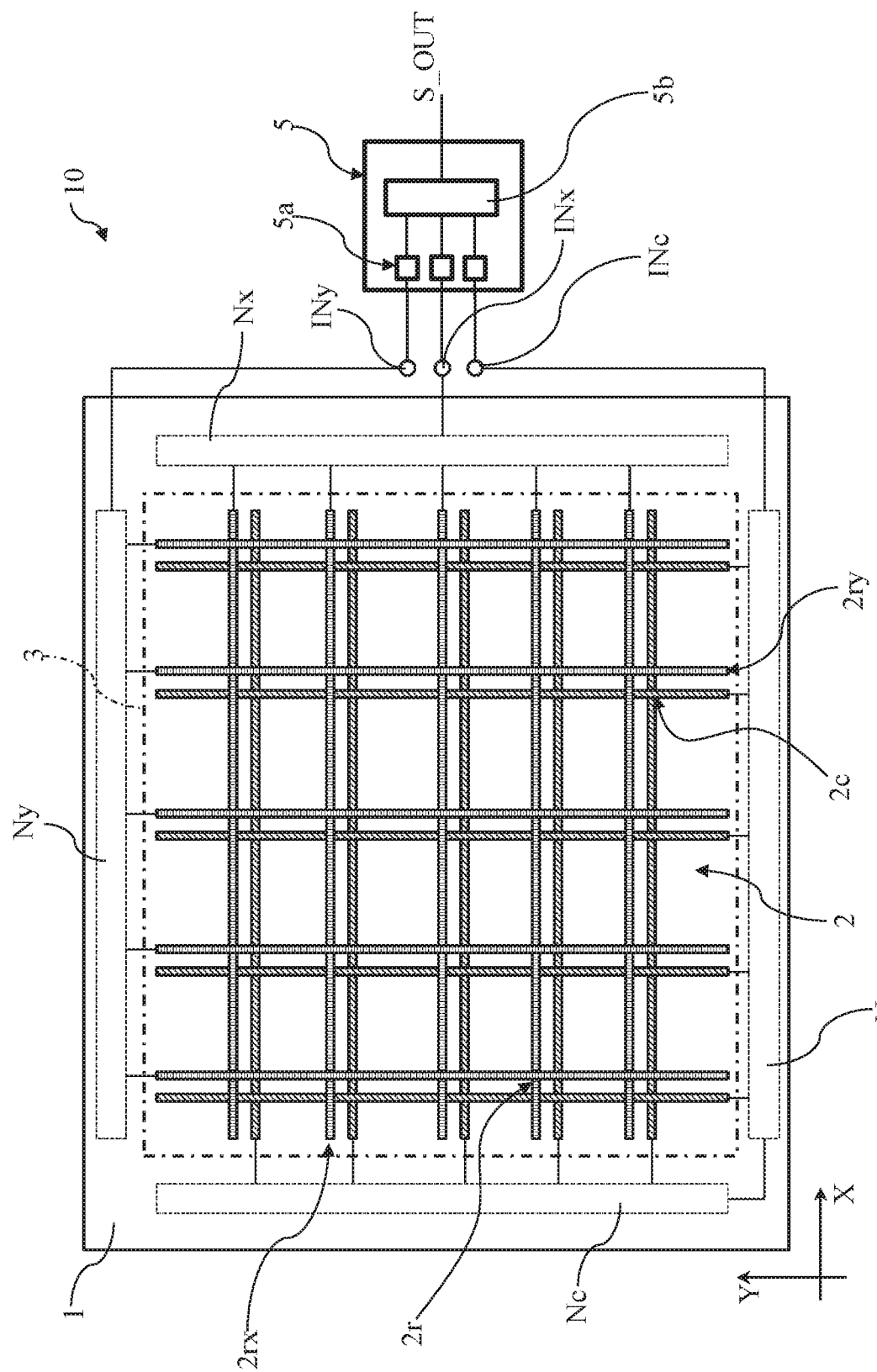

FIG. 4 shows a further embodiment of a capacitive touch sensor 10 according to the present invention. The capacitive touch sensor 10 shown in FIG. 4 comprises the same first set 2*rx* and second set 2*ry* of electrically resistive yarns 2*r* of the embodiment shown in FIG. 3. The sensing area 3 defined by the electrically resistive yarns 2*r* is symbolically indicated as a dotted rectangle.

With respect to FIG. 4, sensing yarns 2 further comprise a plurality of electrically conductive yarns 2*c* arranged at least partially within the sensing area 3 and electrically insulated from the electrically resistive yarns 2*r*.

Preferably, each electrically conductive yarn 2*c* is associated to a correspondent electrically resistive yarn 2*r* and vice versa. In other words, the embodiment shown in FIG. 4 provides that the number of electrically conductive yarns 2*c* is equal to the number of electrically resistive yarns 2*r* and that for each electrically resistive yarn 2*r* an electrically conductive yarn 2*c* is associated thereto. However, as explained above, further embodiments may provide a different number and/or a different arrangements of electrically conductive yarns 2*c* with respect to the embodiment shown in FIG. 4 still remaining within the scope of protection of the present invention.

According to an aspect of the present invention, number and arrangement of the electrically conductive yarns 2*c* is chosen so that when a touch event occurs on the sensing area 3 defined by the electrically resistive yarns 2*r*, at least one electrically conductive yarn 2*c* is touched.

In other words, the skilled person, knowing the average size of the sensing area portion touched by the objects intended to be used (e.g. a finger of a user, a tip of a touch pen), is able to choose the number and the arrangement of electrically resistive yarns and/or electrically conductive yarns so that when an object touches the sensing area 3 at least one electrically resistive yarn and at least one electrically conductive yarn (if present) is touched.

Preferably, with respect to the embodiment shown in FIG. 4, sensing yarns 2 are arranged so that when a touch event occurs on the sensing area 3 at least one electrically resistive yarn 2*r* of the first set 2*rx*, at least one electrically resistive yarn 2*r* of the second set 2*ry* and at least one electrically conductive yarn 2*c* are touched together.

With respect to FIG. 4, the electrically conductive yarns 2*c* are electrically connected to a reference common node Nc configured to be electrically connected to a reference input INc of the detection device 5 for evaluating the capacitance value Cc of the electrically conductive yarns 2*c*. The electrically resistive yarns 2*rx* are electrically connected to a first common node Nx configured to be electrically connected to a first input INx of the detection device 5 for evaluating the capacitance value CRx of the first set 2*rx* of electrically resistive yarns 2*r*. The electrically resistive yarns 2*ry* are electrically connected to a second common node Ny configured to be electrically connected to a second input INy of the detection device 5 for evaluating the capacitance value CRy of the second set 2*ry* of electrically resistive yarns 2*r*.

The detection device 5 is preferably configured to evaluate the capacitance values CRx, CRy and Cc of the first and second set 2*rx*, 2*ry* of electrically resistive yarns 2*r* and of the electrically conductive yarns 2*c* by means of the same techniques discussed above.

Some embodiments may provide that the output signal S_OUT comprises three output values: a first output value OUTx that is the direct or indirect measurement of the capacitance CRx of the first set 2*rx* of electrically resistive yarns 2*r*, a second output value OUTy that is the direct or indirect measurement of the capacitance CRy of the second set 2*ry* of electrically resistive yarns 2*r*, and a reference output value OUTc that is the direct or indirect measurement of the capacitance Cc of the electrically conductive yarns 2*c*.

Some embodiments may provide that the detection device 5 is configured to calculate (for example by means of the microcontroller 5*b*) the ratio values CRx/Cc and CRy/Cc. In particular, CRx/Cc is the ratio between the direct or indirect measurement of the capacitance CRx of the first set 2*rx* of electrically resistive yarns 2*r* and the direct or indirect measurement of the capacitance Cc of the electrically conductive yarn 2*c*. CRy/Cc is the ratio between the direct or indirect measurement of the capacitance CRy of the second set 2*ry* of electrically resistive yarns 2*r* and the direct or indirect measurement of the capacitance Cc of the electrically conductive yarn 2*c*.

In these embodiments, the first output value OUTx and the second output value OUTy may be preferably the ratio CRx/Cc and the ratio CRy/Cc, respectively. More preferably, the detection device 5 may be configured to provide an output signal S_OUT comprising only the first output value OUTx and the second output value OUTy.

As explained above, the value of the ratio CRx/Cc is indicative of the location of a touch event along the first direction X with a negligible dependency of the capacitive coupling between the electrically resistive yarns 2*rx* and the object touching them. Analogously, the ratio CRy/Cc is indicative of the location of a touch event along the second direction Y with a negligible dependency of the capacitive coupling between the electrically resistive yarns 2*ry* and the object touching them.

In other words, the values of the ratio CRx/Cc and CRy/Cc are indicative of the location of a touch event along the first direction X and the second direction Y with respect to the position of the common node Nx and Ny irrespectively of how strong is the capacitive coupling between the electrically resistive yarns 2*rx*, 2*ry* and the object touching them.

The values of ratio CRx/Cc and CRy/Cc can be considered as coordinates of a Cartesian plane X-Y having abscissa parallel to the first direction X and ordinate parallel to the second direction Y.

Thus, when a touch event occurs on the sensing area 3, the ratio values CRx/Cc and CRy/Cc overcome a correspondent threshold value and assume two values that are indicative of the position of the touch event on the sensing area 3.

In particular, CRx/Cc assumes a value within a range of values comprised between a first lower value and a first upper value. CRy/Cc assumes a value within a range of values comprised between a second lower value and a second upper value. For example, the first lower value and the second lower value can be considered the origin of the Cartesian plane X-Y.

Thanks to this embodiment the capacitive touch sensor 10 needs of only three inputs INx, INy and INc for the detection of the location of a touch event on the sensing area 3 also in case of a wide sensing area 3 and/or a great number of sensing yarns 2.

Sensing yarns 2 (or in general sensing elongated elements 2) may be coupled to the support layer 1 by various coupling technics known per se in the art.

For example, some embodiments may provide that the sensing elongated elements 2 comprise traces of electrically resistive material (as electrically resistive elongated elements 2r) and/or traces of electrically conductive material (as electrically conductive elongated elements 2c) arranged along a substantially linear paths. Such traces may be produced for example including a biopolymer (such as microbial cellulose, microbial collagen, cellulose/chitin copolymer, microbial silk, or a mixture thereof) with electrically conductive material (such as carbonaceous material, preferably selected from the group consisting of activated carbon, high surface area carbon, graphene, graphite, activated charcoal, carbon nanotubes, carbon nanofibers, activated carbon fibers, graphite fibers, graphite nanofibers, carbon black and mixtures thereof). A preferred embodiment provides that the biopolymer is microbial cellulose. For example, electrically conductive material may be provided to the biopolymer (e.g., to a biopolymer layer or trace) by printing (e.g., screen printing and/or digital printing), or by localized impregnation.

According to an embodiment, a culture containing biopolymer-producing microorganisms comprises electrically conductive material. For example, the support layer may be contacted with a culture including biopolymer-producing microorganisms and an electrically conductive material. The microorganisms may be cultured to produce a biopolymer including electrically conductive material, so that the support layer is provided with a trace of electrically resistive material made of biopolymer comprising electrically conductive material.

A suitable process for producing patterns, or traces, of electrically resistive material by means of biopolymer is described in the European patent application No. EP18197348.8 in the name of the present Applicant, having the following title: "A PROCESS FOR PROVIDING A TEXTILE WITH ELECTRICAL CONDUCTIVITY PROPERTIES", the content of which is incorporated herein by reference as if set forth in its entirety.

According to an aspect of the present invention, the support 1 layer may be a fabric. Sensing yarns 2 may be coupled to a fabric 1 by sewing, by knitting, by weaving, or by any other coupling technique known in the art.

Figure 5:
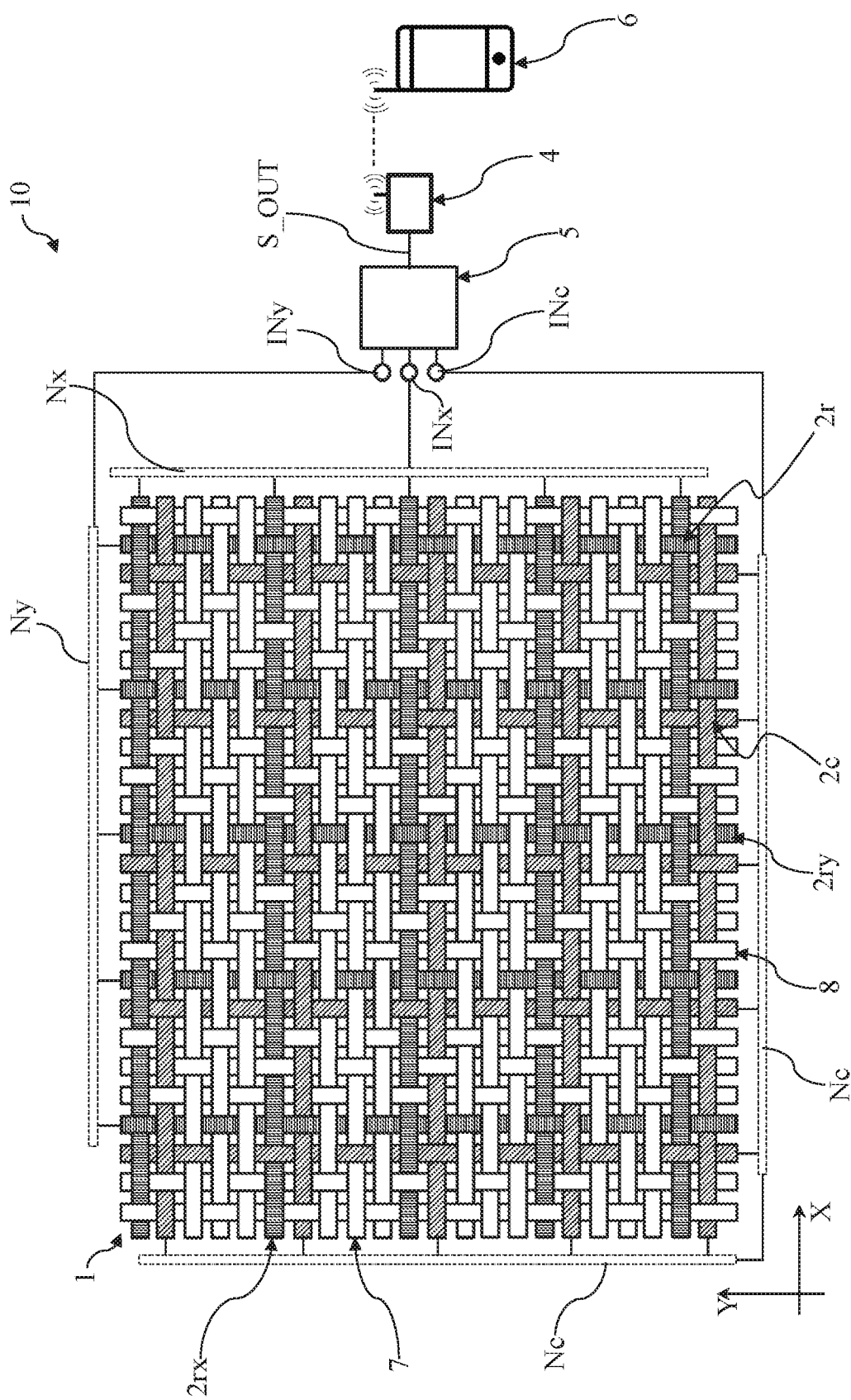

FIG. 5 shows a preferred embodiment of a capacitive touch sensor 10 according to the present invention. The embodiment shown in FIG. 5 has the same sensing yarns 2, or in general the same sensing elongated element 2, of the embodiment shown in FIG. 4, wherein the support layer 1 is a woven fabric and wherein sensing yarns 2 form at least part of the weft 7 and of the warp 8 of the woven fabric 1.

Further embodiments may provide that sensing yarns 2 form at least part of the weft or of the warp of a woven fabric 1, for example in the case of a capacitive touch sensor 10 implementing a one-dimensional swipe sensor as shown in FIGS. 1 and 2, still remaining within the scope of protection of the present invention. In general, sensing yarns 2 preferably form at least part of the weft and/or of the warp of a woven fabric 1.

Preferably, sensing yarns 2 can be used as a sensing core of a composite yarn having a sheath formed for example by an electrically non-conductive yarn having an electrical resistance per unit of length Rn greater than 100 MΩ/m, more preferably greater than 1 GΩ/m. According to an aspect of the present invention, the sheath of the composite yarn comprises staple fibers made of an electrically non-conductive material, preferably having electrical resistivity greater than $10^3$ Ωm, more preferably greater than $10^6$ Ωm.

The sensing yarns 2 may be preferably core-spun with the staple fibers of the sheath. Some embodiments may provide that the sensing yarns 2 are embroidered around with the staple fibers of the sheath, or covered by other sheathing processes known in the art. The staple fibers are preferably natural fibers such as cotton, wool, silk and the like. Some embodiments may provide that the sheath of the composite yarn is provided with a dyeing, for example an indigo dye.

Some embodiments may provide that each electrically conductive yarn 2c is coupled to a correspondent electrically resistive yarn 2r and vice versa, forming a composite yarn. A suitable composite yarn may be preferably the one as described in the European patent application No. EP18172676.1 in the name of the same Applicant and having the following title: "COMPOSITE YARN FOR THE POSITION SENSITIVE CAPACITIVE TOUCH SENSING" (see in particular page 9-15), the contents of which is incorporated herein by reference as if set forth in its entirety.

With respect to FIG. 5, the detection device 5 is preferably connected to a communication module 4 configured to transmit the output signal S_OUT to an external device 6.

The capacitive touch sensor 10 of the present invention may be used for controlling or sending a control command to an external device 6. Preferably, the communication module 4 is a wireless communication module (e.g. Bluetooth module, WiFi module, Infrared module, and the like).

The capacitive touch sensor 10 may be coupled to the fabric 1 of an article for providing a sensing region that allows the user to control an external device 6 in a simple and reliable way.

Some embodiments may provide that the that the touch sensor 10 is coupled to a fabric 1 of a garment, preferably a shirt, a jacket or a pair of pants, on a sensing region (for example the cuff of a shirt, a sleeve of a jacket, or a pant leg) for allowing the wearer to control an external device 6 (e.g. a smartphone, a music player, or the like) easily.

Some embodiments may provide that the touch sensor 10 is coupled to a fabric 1 for lining a seating furniture (preferably a sofa or an armchair) on a sensing region (e.g. on the arms of the seating furniture) for allowing the sitting user to control an external device 6 (e.g. a smart TV, a stereo or the like) easily.

Summarizing, a method for detecting a touch event on a support layer 1 comprises the following steps:
(a) providing a capacitive touch sensor 10 according to anyone of the embodiments described above;
(b) evaluating one or more of the capacitance values CRx, CRy, Cc of the sensing elongated elements 2;
(c) providing an output signal S_OUT comprising one or more output values OUTx, OUTy, OUTc that are a function of the capacitance CRx, CRy, Cc evaluated in the step (b).

Preferably, the method may provide a step of transmitting the output signal S_OUT to an external device 6.

The invention claimed is:

1. A capacitive touch sensor (10) comprising a support layer (1) and a plurality of sensing elongated elements (2) coupled to said support layer (1), said plurality of sensing elongated elements (2) comprising a plurality of electrically resistive elongated elements (2*r*), wherein said plurality of electrically resistive elongated elements (2*r*) comprises a first set (2*rx*) of electrically resistive elongated elements (2*r*) electrically connected to a first common node (Nx) configured to be electrically connected to a first input (INx) of a detection device (5), said detection device (5) being configured to provide an output signal (S_OUT) comprising a first output value (OUTx) that is a function of the capacitance value (CRx) of said first set (2*rx*) of electrically resistive elongated elements (2*r*), wherein said plurality of electrically resistive elongated elements (2*r*) define a sensing area (3), said plurality of sensing elongated elements (2) comprising at least one electrically conductive elongated element (2*c*) arranged at least partially within said sensing area (3) and electrically insulated from said electrically resistive elongated elements (2*r*), said at least one electrically conductive elongated element (2*c*) being electrically connected to a reference common node (Nc) configured to be electrically connected to a reference input (INc) of said detection device (5) for evaluating the capacitance (Cc) of said at least one electrically conductive elongated element (2*c*) and wherein the electrical resistance per unit of length (Rc) of said at least one electrically conductive elongated element (2*c*) is at least two order of magnitude less than the electrical resistance per unit of length (Rr) of said electrically resistive elongated elements (2*r*).

2. The capacitive touch sensor (10) according to claim 1, wherein said first output value (OUTx) is the direct or indirect measurement of the capacitance (CRx) of said first set (2*rx*) of electrically resistive elongated elements (2*r*).

3. The capacitive touch sensor (10) according to claim 1, wherein said at least one electrically conductive elongated element (2*c*) is arranged to define an area overlapping said sensing area (3).

4. The capacitive touch sensor according to claim 1, wherein said plurality of sensing elongated elements (2) comprises a plurality of said electrically conductive elongated elements (2*c*) electrically connected to said reference common node (Nc), each electrically conductive elongated element (2*c*) is associated to a correspondent electrically resistive elongated element (2*r*) of said plurality of sensing elongated elements (2) and vice versa each electrically resistive elongated element (2*r*) is associated to a correspondent electrically conductive elongated element (2*c*).

5. The capacitive touch sensor (10) according to claim 1, wherein said output signal (S_OUT) comprises a reference output value (OUTc) that is the direct or indirect measurement of the capacitance (Cc) of said at least one electrically conductive elongated element (2*c*).

6. The capacitive touch sensor (10) according to claim 1, wherein said first output value (OUTx) is the ratio (CRx/Cc) between the direct or indirect measurement of the capacitance (CRx) of said first set (2*rx*) of electrically resistive elongated elements (2*r*) and the direct or indirect measurement of the capacitance (Cc) of said at least one electrically conductive elongated element (2*c*).

7. The capacitive touch sensor (10) according to claim 1, wherein said plurality of electrically resistive elongated elements (2*r*) comprises a second set (2*ry*) of electrically resistive elongated elements (2*r*), electrically insulated from said first set (2*rx*) of electrically resistive elongated elements (2*r*), and electrically connected to a second common node (Ny) configured to be electrically connected to a second input (INy) of said detection device (5), wherein said first set (2*rx*) and said second set (2*ry*) of electrically resistive elongated elements (2*r*) overlap to form a grid of electrically resistive elongated elements (2*r*), said output signal (S_OUT) comprising a second output value (OUTy) that is a function of the capacitance value (CRy) of said second set (2*ry*) of electrically resistive elongated elements (2*r*).

8. The capacitive touch sensor (10) according to claim 7, wherein said second output value (OUTy) is the direct or indirect measurement of the capacitance (CRy) of said second set (2*ry*) of electrically resistive elongated elements (2*r*).

9. The capacitive touch sensor (10) according to claim 7, wherein said second output value (OUTy) is the ratio (CRy/Cc) between the direct or indirect measurement of the capacitance (CRy) of said second set (2*ry*) of electrically resistive elongated elements (2*r*) and the direct or indirect measurement of the capacitance (Cc) of said at least one electrically conductive elongated element (2*c*).

10. The capacitive touch sensor (10) according to claim 7, wherein the electrically resistive elongated elements of said first set (2*rx*) are arranged parallel to each other along a first direction (X).

11. The capacitive touch sensor (10) according to claim 10, wherein the electrically resistive elongated elements of said second set (2*ry*) are arranged parallel to each other along a second direction (Y) orthogonal to said first direction (X).

12. The capacitive touch sensor (10) according to claim 1, wherein said detection device (5) is connected to a communication module (4) configured to transmit said output signal (S_OUT) to an external device (6).

13. The capacitive touch sensor (10) according to claim 1, wherein said support layer (1) is a fabric.

14. The capacitive touch sensor (10) according to claim 1, wherein said electrically resistive elongated elements (2*r*) are electrically resistive yarns.

15. The capacitive touch sensor (10) according to claim 1, wherein said electrically conductive elongated elements (2*c*) are electrically conductive yarns.

16. The capacitive touch sensor (10) according to claim 1, wherein said support layer (1) is a woven fabric, and wherein said plurality of sensing elongated elements (2) form at least a part of the weft (7) and/or of the warp (8) of said woven fabric (1).

17. An article comprising a capacitive touch sensor (10) according to claim 1, said article optionally comprising a detection device (5).

18. The capacity sensor according to claim 1, wherein said Rr/Rc is in range of 100 to 100000.

* * * * *